US007486652B2

(12) United States Patent
Chang

(10) Patent No.: US 7,486,652 B2
(45) Date of Patent: Feb. 3, 2009

(54) GATEWAY

(75) Inventor: Wen-Ching Chang, Taipei (TW)

(73) Assignee: Inventec Appliances Corp., Taipei (TW)

( * ) Notice: Subject to any disclaimer, the term of this patent is extended or adjusted under 35 U.S.C. 154(b) by 477 days.

(21) Appl. No.: 11/395,228

(22) Filed: Apr. 3, 2006

(65) Prior Publication Data

US 2007/0230417 A1 Oct. 4, 2007

(51) Int. Cl.
*H04Q 3/00* (2006.01)
(52) U.S. Cl. ...................................................... 370/338
(58) Field of Classification Search ........................ None
See application file for complete search history.

(56) References Cited

U.S. PATENT DOCUMENTS

| 7,092,369 B2 * | 8/2006 | Fuccello et al. | 370/328 |
| 7,280,547 B2 * | 10/2007 | Featherston et al. | 370/401 |
| 2002/0118664 A1 * | 8/2002 | Ishibashi et al. | 370/338 |
| 2003/0072330 A1 * | 4/2003 | Yang et al. | 370/493 |
| 2005/0117555 A1 * | 6/2005 | Nian | 370/338 |

* cited by examiner

*Primary Examiner*—Ajit Patel
(74) *Attorney, Agent, or Firm*—Troxell Law Office, PLLC

(57) ABSTRACT

A gateway includes a local area network (LAN) port, a mobile communication interface and a controlling module. The gateway uses the LAN port to communicate with a LAN outside the gateway, and uses the mobile communication interface connecting to an mobile communication apparatus to communicate with a telecommunication network outside the gateway. The controlling module built in the gateway includes a detecting module and a driving module. The detecting module is used for detecting if the mobile communication apparatus connects to the mobile communication interface. As soon as the detecting module finds the mobile communication apparatus, the driving module is activated to utilize the mobile communication apparatus to communicate with the telecommunication network, and thereby the gateway can establish a communication between the LAN and the telecommunication network.

12 Claims, 3 Drawing Sheets

GATEWAY

BACKGROUND OF THE INVENTION (1) Field of the Invention

The present invention relates to a gateway, and more particularly to the gateway which can communicate with a telecommunication network through a mobile communication apparatus.

(2) Description of the Prior Art

Please refer to FIG. 1, FIG. 1 is a schematic diagram showing the connection of a conventional gateway 2 in a network. The gateway 2 is used for communication between an internet 10 and a local area network (LAN) 12. The LAN 12 can be a wireless LAN or an Ethernet LAN.

In general, the range of the LAN 12 is limited to a specific local area, and the gateway 2 is usually located near the LAN 12. Furthermore, several LANs are cabled together to transmit data signals to the internet 10. That is, not each of the gateway 2, which is located near the specific local area, can connect to the internet 10.

For the connection between the gateway 2 and the internet 10, a telecommunication module 4 is built in the gateway 2 to communicate the gateway 2 with a base station 6. Through a digital subscriber line access multiplexer (DSLAM) provided by a telecommunication office 8, the base station 6 can communicate with the internet 10. That is, by establishing the communication pathway (gateway 2< - - - > base station 6< - - - > DSLAM < - - - > internet 10), the gateway 2 is able to bridge the LAN 12 and the internet 10.

In general, various communication protocols are already available in the marketplace for the base station 6; including GSM (Global System for Mobile Communication), PHS (Personal Handy-Phone System), GPRS (General Packer Radio Service), WCDMA (Wideband Code Division Multiple Access) and CDMA2000. Usually, the telecommunication module 4 for PHS only enables the gateway 2 to communicate between the LAN 12 and the internet 10 through the communication protocol for PHS. That is, if a base station 6 of PHS does not exist, the gateway 2 is not able to communicate between the LAN 12 and the internet 10 through the communication protocol for PHS.

On the other hand, if the gateway 2 is desired to be capable of communicating between the LAN 12 and the internet 10 through any communication protocol for GSM, PHS, GPRS, WCDMA or CDMA2000, all telecommunication modules for GSM, PHS, GPRS, WCDMA and CDMA2000 are needed to be included in the gateway 2. Definitely, in order to meet such a versatile application, both the size and the cost of the gateway 2 are clear the trade-off.

SUMMARY OF THE INVENTION

It is therefore a primary object of the present invention to provide a gateway which can communicate between a LAN and an internet without including all these telecommunication modules for PHS, GSM, GPRS, WCDMA, and CDMA 2000.

It is therefore another object of the present invention to provide a gateway which cannot only save the installation space for the telecommunication modules, but also reduce the cost of these telecommunication modules.

The present invention is to provide a gateway having a local area network (LAN) port, a mobile communication interface and a controlling module. The gateway uses the LAN port to communicate with a LAN outside the gateway, and uses the mobile communication interface to connect to an mobile communication apparatus for communicating with a telecommunication network outside the gateway. The controlling module, built in the gateway, includes a detecting module and a driving module. The detecting module is used for detecting the mobile communication apparatus after the mobile communication apparatus connects to the mobile communication interface. As the detecting module detects the mobile communication apparatus, the driving module is used for driving the mobile communication apparatus to communicate with the telecommunication network. Upon such an arrangement, the gateway can communicate between the LAN and the telecommunication network.

All these above objects of the present invention will undoubtedly become obvious to those of ordinary skill in the art after reading the following detailed description of the preferred embodiments which will be illustrated in the various figures and drawings.

BRIEF DESCRIPTION OF THE DRAWINGS

The present invention will now be explained with reference to the preferred embodiments illustrated in the following drawings.

DESCRIPTION OF THE PREFERRED EMBODIMENT

Figure 1:
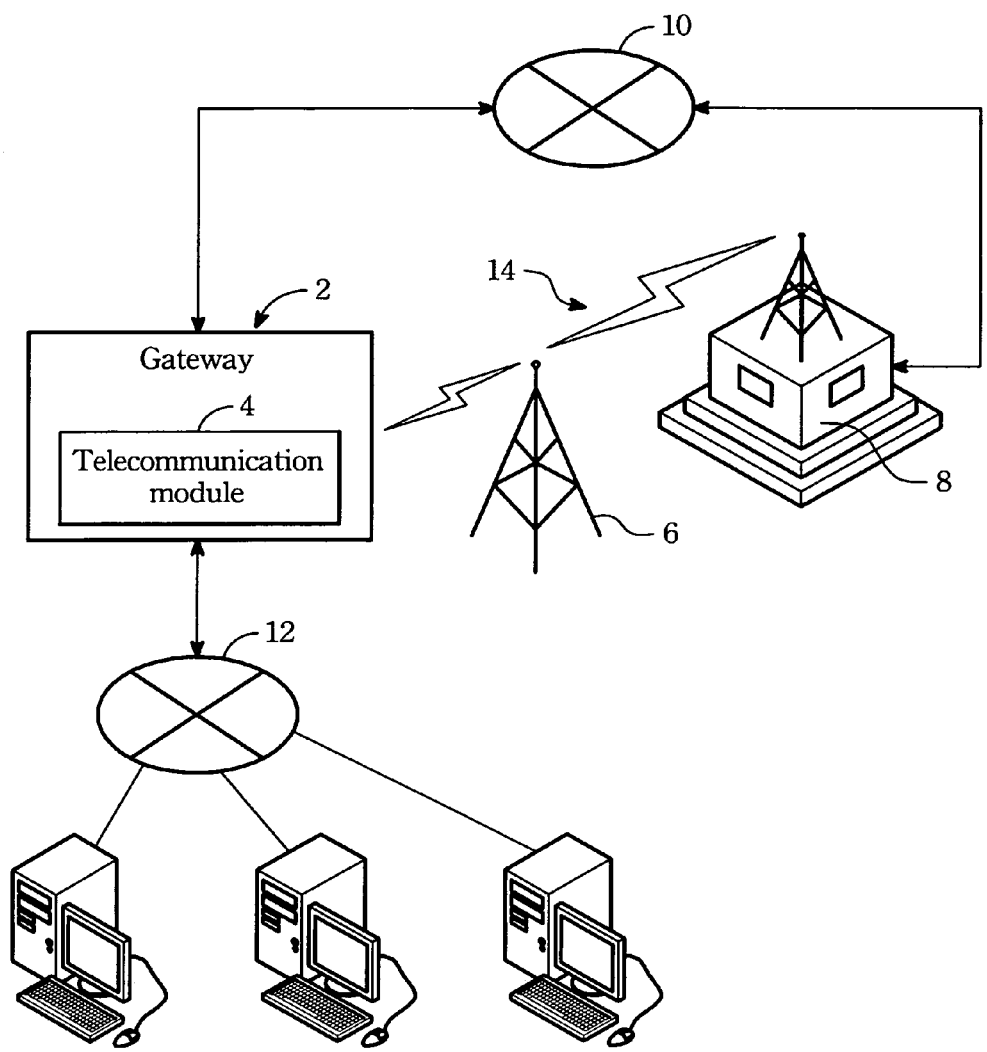
FIG. 1 is a schematic diagram showing the connection of a conventional gateway in a network.
Figure 2:
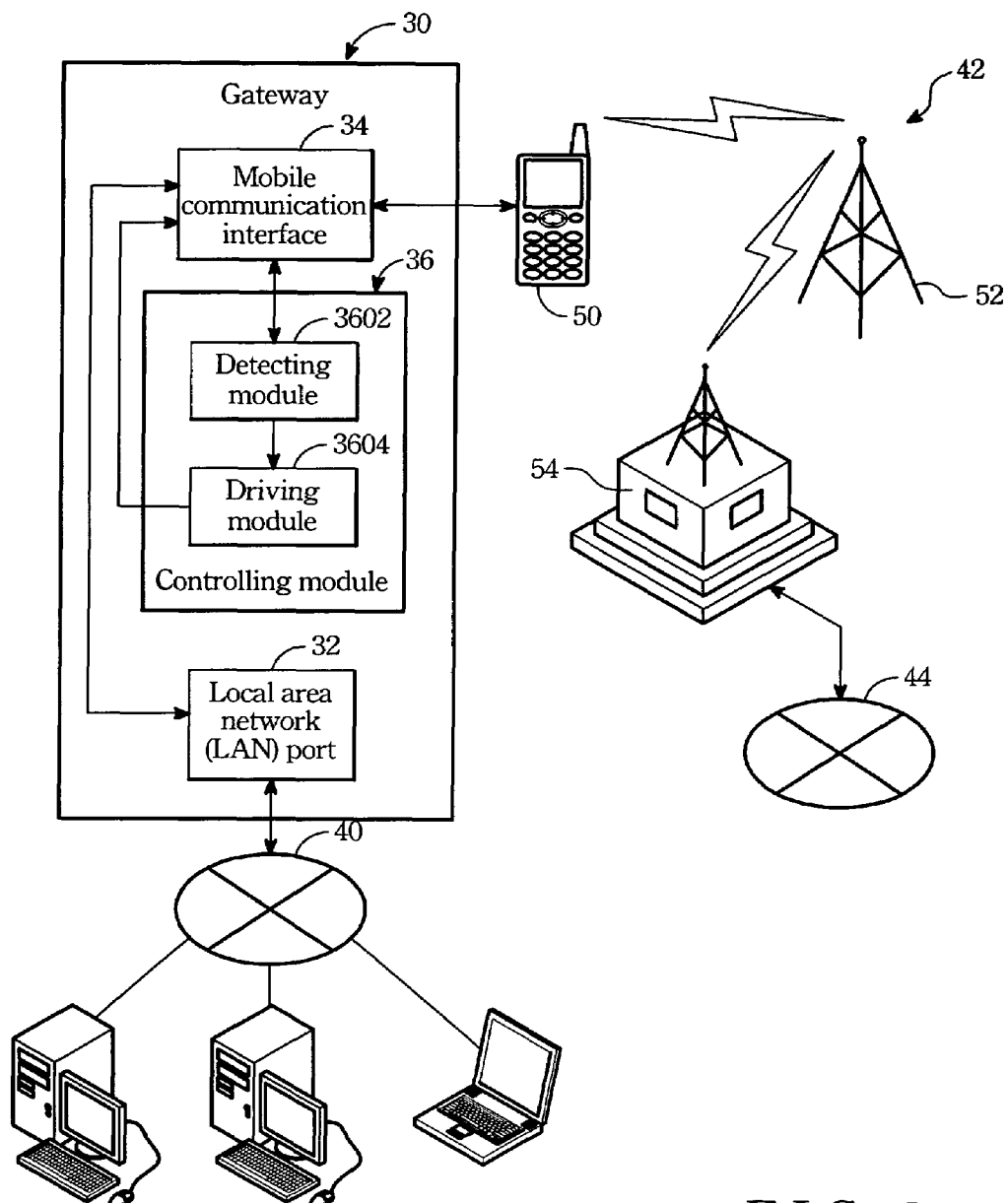
FIG. 2 is a schematic diagram showing the connection of a preferred gateway of the present invention in a network.

Referring now to FIG. 2, a schematic diagram shows the connection of a preferred gateway 30 of the present invention in a network. The gateway 30 includes a local area network (LAN) port 32, a mobile communication interface 34 and a controlling module 36.

The LAN port 32, built in the gateway 30, is connected to and thus communicates with a local area network (LAN) 40 outside the gateway. The LAN 40 can be a wireless LAN or an Ethernet LAN.

The mobile communication interface 34, built in the gateway 30, is connected to both the LAN port 32 in the gateway 30 and a mobile communication apparatus 50 outside the gateway so as to communicate between the LAN port 32 and the mobile communication apparatus 50. The mobile communication interface 34 can be an RS 232 or a universal serial bus (USB).

The controlling module 36, built in the gateway 30, includes a detecting module 3602 and a driving module 3604. The detecting module 3602 is used for detecting whether the mobile communication apparatus 50 is connected to the mobile communication interface 34 or not. As the detecting module 3602 detects that the mobile communication apparatus 50 is connected to the mobile communication interface, the driving module 3604 is activated to drive the mobile communication apparatus 50 to communicate with a telecommunication network 42 outside the gateway 30 so as to enable communication between the gateway 30 and the telecommunication network 42. In the present invention, the mobile communication apparatus 50 can be a mobile phone.

After the controlling module 36 enables the gateway 30 to communicate with the telecommunication network 42 through the mobile communication apparatus 50, the telecommunication network 42 can then communicate with the LAN 40. Further, through a digital subscriber line access multiplexer (DSLAM) provided by the telecommunication office 54, the telecommunication network 42 can communicate with the internet 44. Thereby, the communication between the LAN 40 and the internet 44 can be well established.

Figure 3:
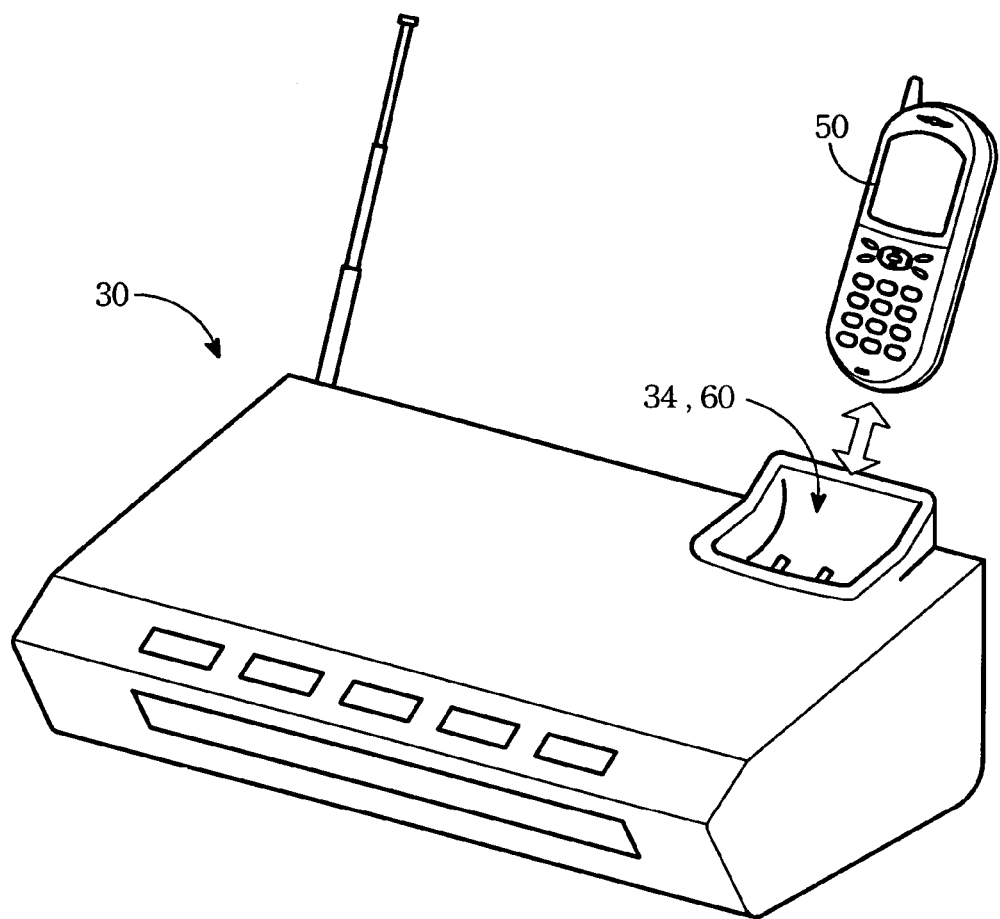
FIG. 3 is a schematic perspective view of a preferred mobile communication interface of the present invention.

Please refer to FIG. 3, FIG. 3 is a schematic perspective view of a preferred mobile communication interface 34 of the present invention. In this embodiment, the mobile communication interface 34 is a mobile communication apparatus charging port 60. Through the mobile communication apparatus charging port 60, the mobile communication apparatus 50 can be electrically charged. That is, the mobile communication interface 34 can not only be used for connecting to the mobile communication apparatus 50, but also can be regarded as a charging interface which is able to recharge the mobile communication apparatus 50.

In general, the mobile communication apparatus 50, may use various types of communication protocols to communicate with the telecommunication network 42, in which these communication protocols may include PHS, GSM, GPRS, WCDMA, and CDMA 2000. By utilizing a specific communication protocol applied in the mobile communication apparatus 50, the gateway 30 can then communicate with the telecommunication network 42 corresponding to the specific communication protocol. Furthermore, the gateway 30 can communicate with the LAN 40. Through the digital subscriber line access multiplexer (DSLAM), the telecommunication network 42 can also communicate with the internet 44. Upon such an arrangement, the LAN 40 can communicate with the internet 44 via the gateway 30.

In other words, while a user wants the telecommunication network 42 to communicate with the internet 44 by a specific communication protocol (ex, PHS), he/she only needs to have a PHS mobile communication apparatus 50 connected to the mobile communication interface 34. Through the connection between the PHS mobile communication apparatus 50 and the mobile communication interface 34, the gateway 30 can well establish a communication between the LAN 40 and the internet 44 no matter whether a PHS telecommunication module is built in the gateway 30.

Therefore, bypassing any specific telecommunication module (ex, PHS, GSM, GPRS, WCDMA, or CDMA 2000) which may be ordinarily built in the gateway 30, the gateway 30 of the present invention is able to bridge the LAN 40 and the internet 44. Therefore, it is not necessarily to construct various telecommunication modules in the gateway 30, the space for these modules can be saved, and the cost for establishing communication between a LAN and the internet can also be substantially reduced.

While the present invention has been particularly shown and described with reference to the preferred embodiments, it can be easily understood by those skilled in the art that various changes on appearances or details may be made without departing from the spirit and scope of the present invention.

What is claimed is:

1. A gateway comprising:
   a local area network (LAN) port for communication with a local area network (LAN) outside the gateway;
   a mobile communication interface for communicating between the LAN port and a mobile communication apparatus outside the gateway; and
   a controlling module enabling communication between the LAN and a telecommunication network outside the gateway, comprising
      a detecting module for detecting the mobile communication apparatus being connected to the mobile communication interface; and
      a driving module for driving the mobile communication apparatus to communicate with the telecommunication network so as to enable communication between the LAN and the telecommunication network, after the mobile communication apparatus is detected by the detecting module to be connected to the mobile communication interface.

2. The gateway of claim 1, wherein the mobile communication apparatus is a mobile phone.

3. The gateway of claim 1, wherein the LAN is a wireless LAN.

4. The gateway of claim 1, wherein the LAN is an Ethernet LAN.

5. The gateway of claim 1, wherein the mobile communication interface is an RS 232.

6. The gateway of claim 1, wherein the mobile communication interface is a universal serial bus (USB).

7. The gateway of claim 1, wherein the mobile communication interface is a mobile communication apparatus charging port.

8. The gateway of claim 1, wherein the mobile communication apparatus uses a communication protocol of PHS.

9. The gateway of claim 1, wherein the mobile communication apparatus uses a communication protocol of GSM.

10. The gateway of claim 1, wherein the mobile communication apparatus uses a communication protocol of GPRS.

11. The gateway of claim 1, wherein the mobile communication apparatus uses a communication protocol of WCDMA.

12. The gateway of claim 1, wherein the mobile communication apparatus uses a communication protocol of CDMA 2000.

* * * * *